INVENTOR.
HAROLD G. HUNT

Dec. 19, 1961 H. G. HUNT 3,013,685
TRASH RAKE HOIST
Filed June 26, 1959 6 Sheets-Sheet 4

INVENTOR.
HAROLD G. HUNT
BY
Beau, Brooks, Buckley & Bean.
ATTORNEYS

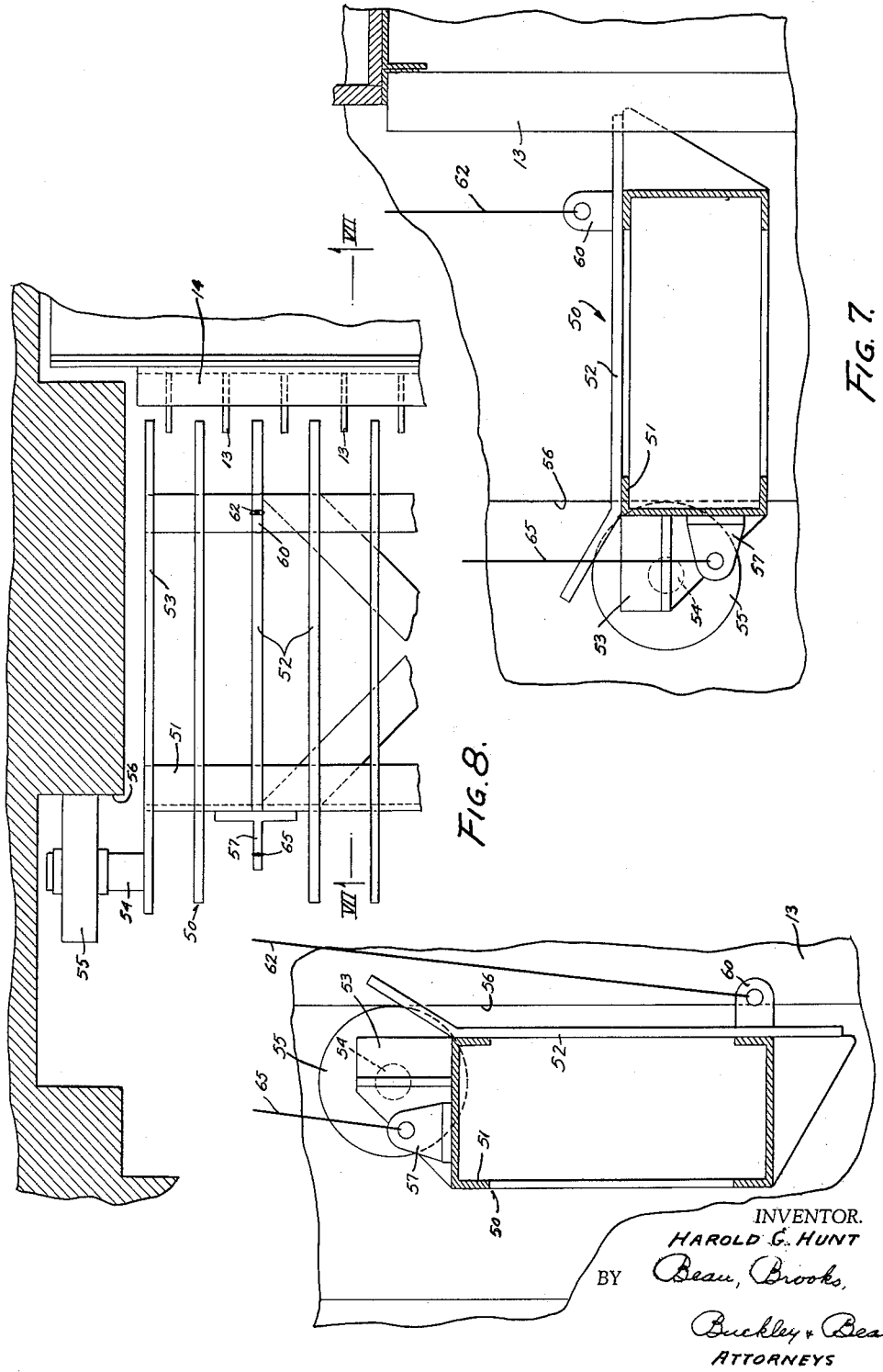

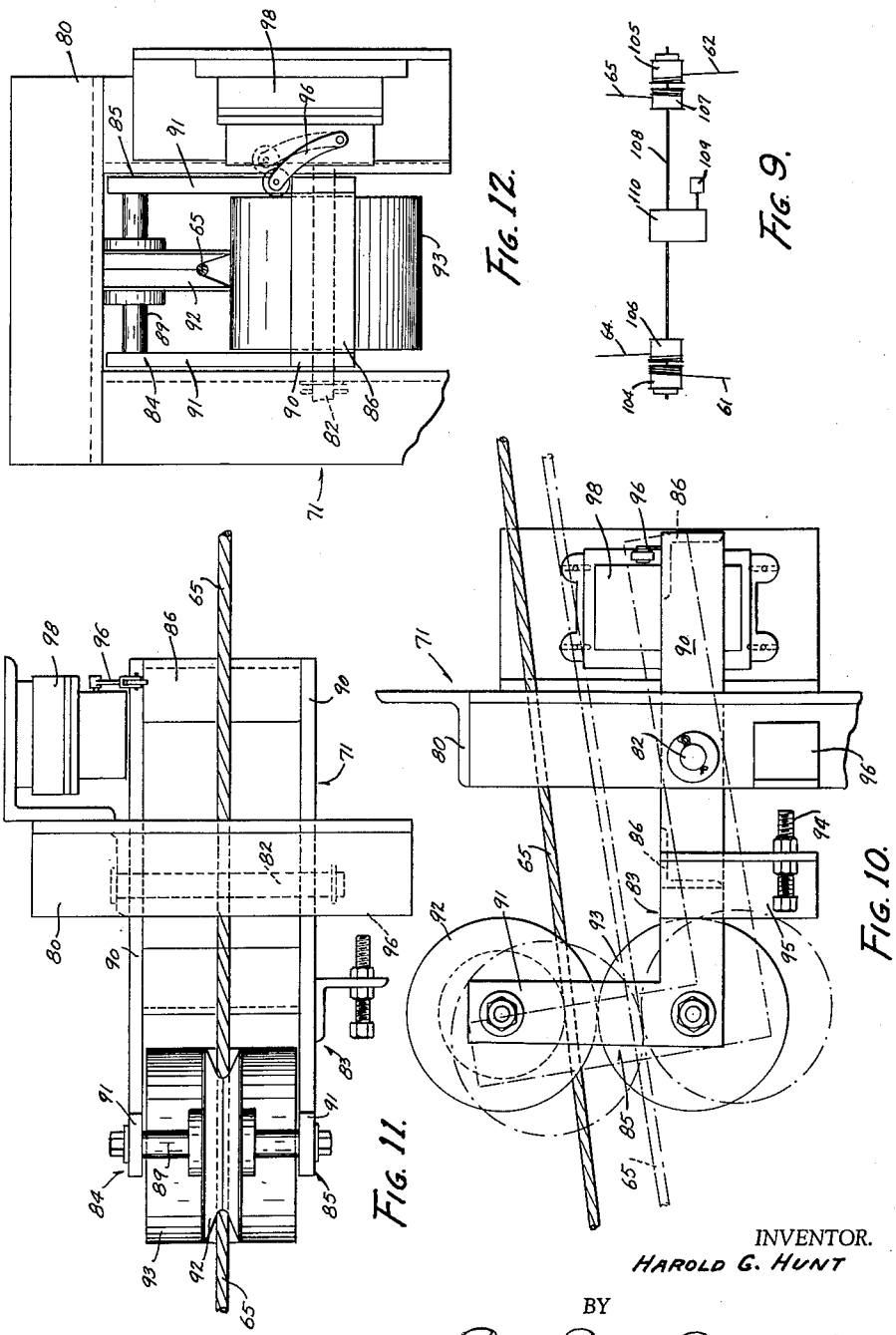

United States Patent Office 3,013,685
Patented Dec. 19, 1961

3,013,685
TRASH RAKE HOIST
Harold G. Hunt, 389 Fillmore Ave., East Aurora, N.Y.
Filed June 26, 1959, Ser. No. 823,129
5 Claims. (Cl. 214—704)

My invention relates in general to trash removing devices, and in particular to a trash rake hoist for use in the removal of the trash accumulation in the intake of a hydraulic turbine.

The principal object of my invention is to provide a pivotally suspended rake which may be lowered in a vertical position behind the trash accumulation before being moved to its horizontal operating position.

Another object is to provide a hoist for suspending said rake and having means for raising and lowering the same.

Another object is to provide two sets of cables for suspending the rake, one set of cables being connected to the rake at the pivotal side thereof and the other set of cables being connected to the free side of the rake.

A further object is to provide two drums for operating the rake cables, one drum being fixed to the drum operating means and the other drum being freely mounted for rotation by and with said fixed drum only after a predetermined amount of rotation thereof.

Another object is to provide means for initially moving the free edge of the rake to its operating position and then hoisting the same in such position to engage and remove the trash.

A further object is to provide the free drum with a gravity actuated brake for exerting sufficient friction to maintain said free drum in predetermined position until it is actuated by said fixed drum.

Moreover, it is an object to provide means for automatically removing slack in the cables connected to the fixed drum.

Furthermore, it is an object to provide suitable guides for said rake in its movement in the trash pit, whereby the teeth of the rake will be maintained in registering positions with the bars of the rack.

The above objects and advantages have been accomplished by the device shown in the accompanying drawings, of which:

FIG. 6 is an enlarged sectional view of the rake in its lowered position;

FIG. 7 is a sectional view showing the rake in its operative position taken on line VII—VII of FIG. 8;

FIG. 8 is a plan view of a fragmentary portion of the rake;

FIG. 9 is a diagrammatic plan view showing an apparatus having four drums;

FIG. 10 is an enlarged side elevation of the limit switch assembly;

FIG. 11 is a plan view thereof;

FIG. 12 is a side elevation thereof;

Figure 2:
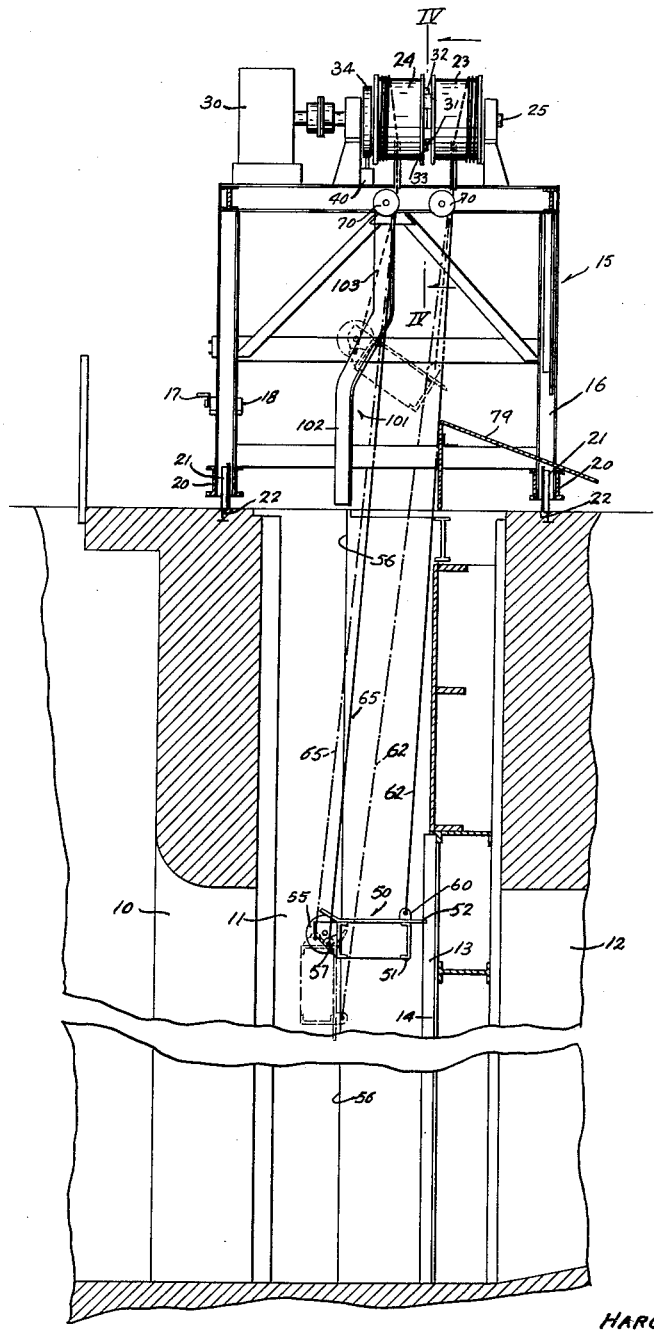
FIG. 2 is a side sectional elevation of the device taken on line II—II of FIG. 1.

As shown in FIG. 2 the intake for the water supplied to the turbine is indicated at 10 which opens up into a trash pit 11 and continues in a penstock 12. As is customary, disposed immediately in front of the opening to the penstock is the usual rack bars 13 carried by a rack frame 14 of usual construction.

Figure 1:
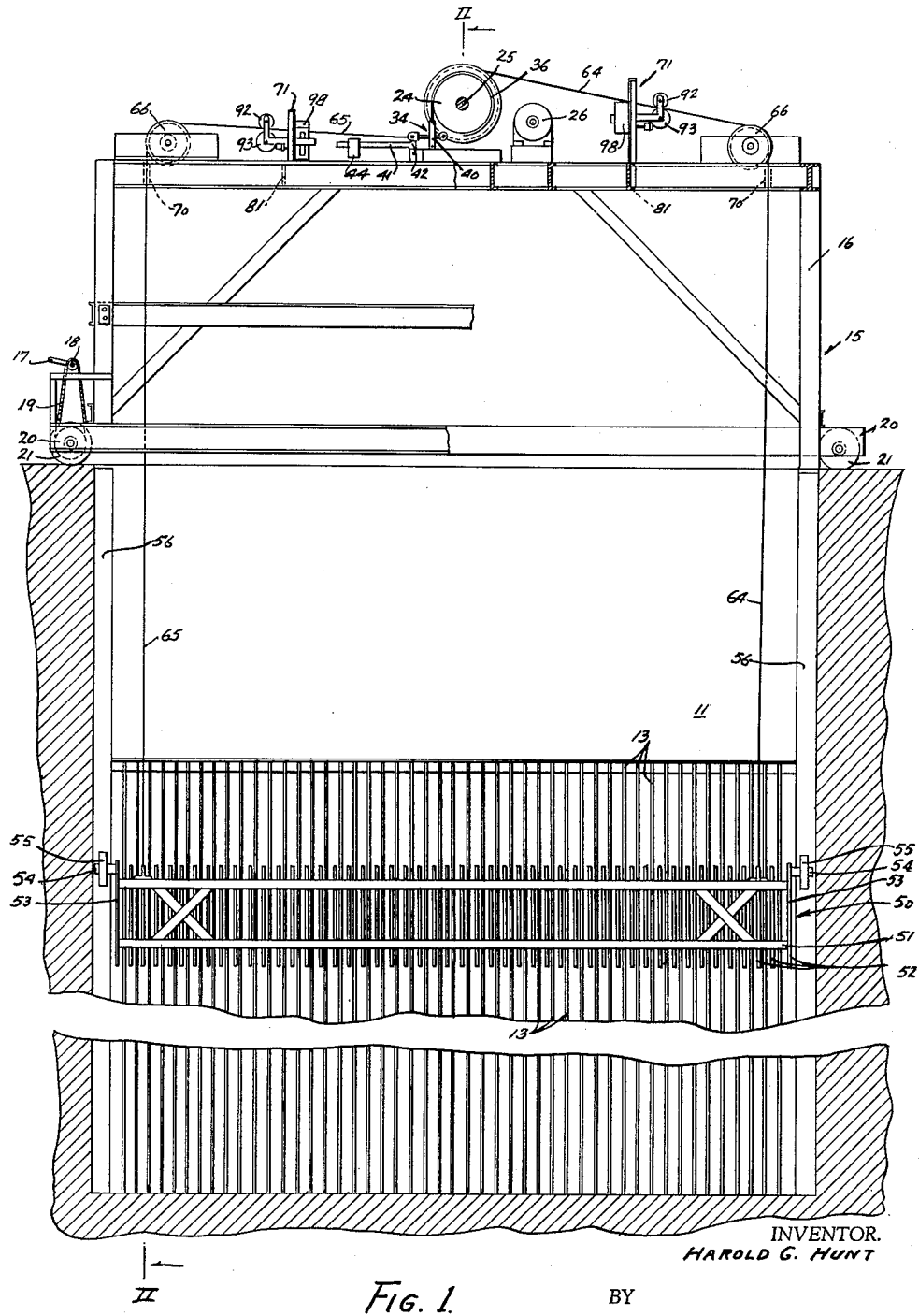
FIG. 1 is a front elevation of my device, partly in section taken on line I—I of FIG. 3.

Mounted above the trash pit is the hoist 15 of my invention. This hoist comprises a frame 16 and is mounted upon structural members 20 one arranged at each longitudinal side thereof. These members are provided at each end with a trolley wheel 21 which engages suitable tracks 22. Means are provided for moving the hoist to and from its operative position as shown in FIGS. 1 and 2 which comprises a handle crank 17 mounted upon a shaft 18 and connected to one of the trolley wheels 21 by means of a chain 19. Carried by the hoist are two adjacent drums 23 and 24. The drum 23 is fixed to the shaft 25 which is driven by a motor 26 through a speed reducing mechanism 30. The drum 24 is mounted upon the shaft 25 for limited relative rotation therewith and it is driven in either direction by means of oppositely arranged lugs 32 and 33 carried by the free drum and engageable with a single lug 31 carried by the fixed drum. The lugs are arranged at the same radial distance from the axis of the drum so that lug 32 or 33 will be brought into contact with the lug 31 carried by the fixed drum when the fixed drum has been rotated through a predetermined arc in either direction. So as to temporarily hold the free drum against rotation while the fixed drum is being rotated through its predetermined arc, a brake 34 is provided. The brake is provided with a brake band 36 having one end fixed to a stationary link 40 and the other end attached to a bell crank lever 41. The arm 42 of the bell crank lever is attached to a fixed pivot 43, and an adjustable weight 44 is carried by the lever. The weight and fulcrum connection to the brake band is such that sufficient friction will be produced by the brake to hold the free drum against rotation until it is actuated by and with the fixed drum.

Figure 3:
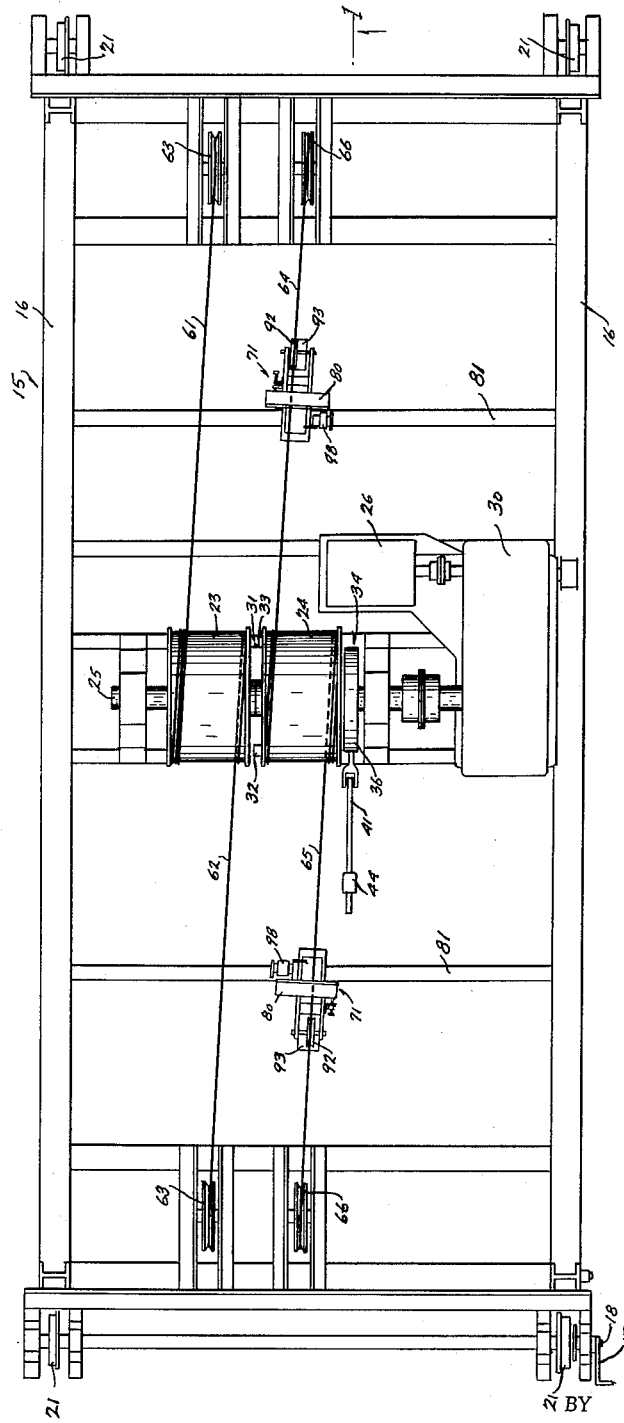
FIG. 3 is a plan view of the device.

The rake 50 of my device comprises a frame 51 having rake teeth 52 extending laterally across the frame and so spaced as to register with and lie within the spaces between the bars 13 of the usual pit rack. The rake is provided at each end with a plate 53 and each plate carries a pivot shaft 54 disposed at the pivotal side of the rake. A pivot wheel 55 is carried by each of the shafts 54 and each pivot wheel engages a guide surface 56 formed in the trash pit for guiding the rake in its upward and downward movements. Arranged near each end of the rake at the pivotal edge thereof is an attachment lug 57 shown in FIGS. 6, 7 and 8, and positioned on the upper side of the rake at each end and near the free edge thereof is an attachment lug 60. The fixed drum 23 shown in FIG. 3 has two cables 61 and 62 which extend in opposite directions from opposite sides of the drum over sheaves 63, the lower end of each of said cables being fixed to the attachment lugs 60 at the free edge of the rake. Cables 64 and 65 extend in opposite directions from opposite sides of the free drum 24 over sheaves 66, and are fixed to the attachment lugs 57 at the pivotal edge of the rake. Suitable guide sheaves 70 are carried by the hoist for guiding the cables as they pass from the sheaves 63 and 66 downwardly for attachment to the rake. A slack cable switch assembly 71 is provided at each side of the free drum for detecting slack in the cables 64 and 65 extending therefrom.

Each of said assemblies comprises a bracket 80 secured to the cross members 81 of the hoist. Pivotally mounted upon a pin 82 carried by said bracket is a bifurcated switch operating arm 83 having spaced legs 84 and 85 joined by cross members 86. Each of said legs is provided with a horizontal member 90 and with a vertical member 91. Slidably disposed upon a shaft 89 between the upper ends of the vertical members is an idler sheave 92 under each of which one of the cables 64 or 65 passes. A weight 93 of cylindrical form is carried by a switch operating arm and is disposed beneath the idler and in close relation to the periphery of the latter, whereby the cable will always hold within the groove of the idler. An adjusting screw 94 is carried by a member 95 secured to the horizontal member 90 of the leg 85 and is engageable with a stop member 96 carried by the bracket 80, whereby the amount of downward pivotal motion of said operating arm may be adjusted. A limit switch 98 is mounted on the bracket 80 at the side opposite the idler 92 and has the control arm 96 thereof disposed in the path of movement of the outer end of the horizontal arm member 90, as shown in FIG. 12.

Obviously, when the rake is being lowered the cables 64 and 65 will be held taut, but should the rake be interrupted in its descent, either or both of the cables will become slack as shown by the dot and dash lines in FIG. 10. When this occurs the weight 93 will pull the idler 92 downwardly thereby maintaining contact with the slack cable and causing the operating arm 83 to be rotated about its pivot pin 82. This rotation will cause the opposite end of the arm to move upwardly into engagement with the control arm 96 of the limit switch 86 thereby moving this arm to the position shown in dotted line in FIG. 12. The limit switch 96 is connected in well known manner, in series with the hoist operating switch (not shown), and when the limit switch is moved to the dotted line shown in FIG. 12, it will be opened and the current supplied to the motor 26 will be interrupted and thereby stop the downward movement of the rake until it is again free to move.

Carried by the hoist is a rake guide 101 preferably of angle iron cross section, having the longitudinal leg 102 thereof in registration with the guide surfaces 56 of the trash pit. An offset portion 103 is provided for guiding the rake 50 when elevated to a position for conveniently depositing the trash upon a disposal platform 79, as shown in dotted lines in FIG. 2.

Figure 4:
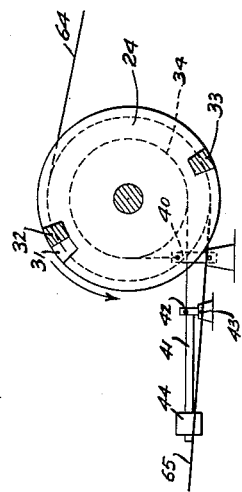
FIGS. 4 and 5 are sectional views taken on line IV—IV of FIG. 2 and show, somewhat diagrammatically, the position of the lugs carried by the drums of the apparatus.
Figure 5:
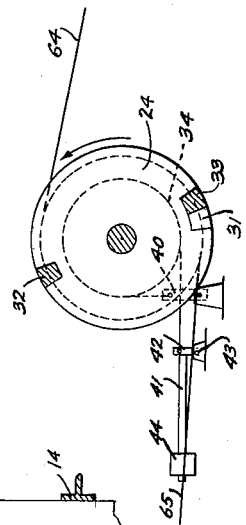

As shown in FIGS. 1 and 6 in full lines, and in FIG. 2 in dot and dash lines, the rake is shown in its vertical or inoperative position and is suspended from the free drum 24 by means of cables 64 and 65. When the rake is in this position it is lowered to the bottom of the trash pit by the unison rotation of both drums. When the rake has reached its lower position, and is to be moved to its horizontal position to remove the trash which has accumulated upon the rack bars, the fixed drum 23 will be operated first and, through the cables 61 and 62, will rotate the rake about its pivots to the position shown in full lines in FIGS. 2, 7 and 8. The free drum 24 is frictionally held against unrestrained rotation at all times by means of the brake 34; and, during the predetermined relative rotation of the fixed drum 23, the lug 31 thereof will travel in counterclockwise direction as viewed in FIG. 4 until it contacts the lug 33 of the free drum as shown in FIG. 5, whereupon further rotation of the fixed drum will cause unison rotation of both drums, thus hoisting the rake in its operative position. When the rake has reached the position shown in dotted lines in FIG. 2 the fixed drum may be rotated sufficiently to tilt the rake thereby causing the trash to be removed therefrom and deposited upon the disposal platform 79. When the rake has been emptied and is to be lowered again into the trash pit, the free drum will be maintained in fixed position by frictional engagement by the brake, and the fixed drum will be independently rotated sufficiently so as to unwind the cables 61 and 62 and permit the rake to be rotated upon its pivots until it has reached the vertical position. When in this position the lug 31 of the fixed drum will have been moved in clockwise direction into engagement with the lug 32 of the free drum and thereby cause this drum to be rotated in unison with the fixed drum to lower the rake.

From the foregoing, it will be obvious that when the rake of my device is in its inoperative position it may be lowered into the pit behind the trash, and, then, when in that position, it may be moved to its operative position beneath the trash and elevated to remove the trash accumulation from the rack.

As shown in the modification illustrated diagrammatically in FIG. 9, four drums may be employed instead of the double cable arrangement used in the other form of the invention. In this form drums 104 and 105 are fixed drums and control movement of the cables 61 and 62, respectively. Drums 106 and 107 are free drums and control movement of the cables 64 and 65, respectively. The drums are mounted upon a common shaft 108 driven by a motor 109 through a speed reducing mechanism 110.

Figure 13:
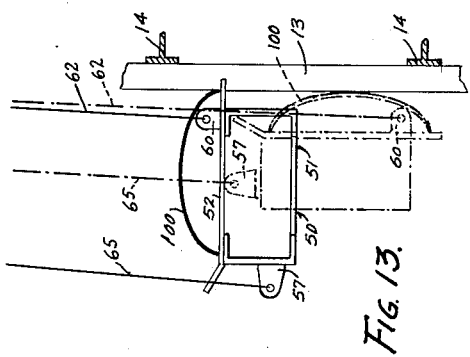
FIG. 13 is a fragmentary side elevation of a modified form of the rake shown in full lines in its elevated position; and, FIG. 14 is a fragmentary plan view thereof in its lowered position.
Figure 14:
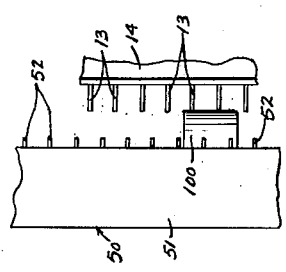

Referring now to the modified form of invention shown in FIGS. 13 and 14, instead of providing the rake with pivot wheels 55 and the pit with guide surfaces 56, the rake is formed on its top side with a number of spaced bearing plates 99. These plates are curved outwardly and are of substantially semi-circular shape for bearing contact with the faces of the registering rack bars 13 when the rake is being moved upwardly or downwardly within the pit.

These and other modifications may be made without departing from the spirit of my invention and the scope of the appended claims; and I do not therefore wish to be limited to the exact embodiment herein shown and described.

What is claimed is:

1. In a device for removing trash from the substantially vertically disposed rack bars of the trash pit of a hydraulic intake, the combination with a trash hoist of a trash rake having teeth with open ends suspended from said hoist by cables attached near each back end of said rake, and by cables attached near each front end of said rake, and an arcuate plate carried by said rake for spacing it from said rack bars while said rake is being lowered into said pit in a substantially vertical inoperative position and a portion of said arcuate plate serving to guide said rake with the open ends of its teeth intermeshed between said rack bars while the rake is being raised in a substantially horizontal operative position by said cables, and means in the hoist for varying the relative length of the front cables with respect to the back cables to bring said rake to its substantially horizontal operative position and thereafter raising all of said cables in unison to lift said rake in a substantially horizontal position past said rack bars and out of said pit.

2. In a device for removing trash from the substantially vertically disposed trash pit rack bars of a hydraulic intake, the combination with a trash hoist, of a trash rake movably supported from said hoist and alternately movable to an inactive vertical position and to an active horizontal position, said rake comprising a frame, rake teeth carried by said frame and having portions movable between the cooperating bars of said rack, and bearing plates carried by said rake for sliding contact with the rack bars for guiding said rake in its vertical position with the rake teeth out of engagement with said rack bars, and in its horizontal position with the rake teeth intermeshed between said rack bars.

3. In a device for removing trash from the substantially vertically disposed rack bars of the trash pit of a hydraulic intake, the combination with a trash hoist of a trash rake having teeth with open ends suspended from said hoist by cables attached near each back end of said rake, and by cables attached near each front end of said rake, and arcuate plates carried by said rake for spacing it from said rack bars while said rake is being lowered into said pit in a substantially vertical inoperative position and a portion of said arcuate plates serving to guide said rake with the open ends of its teeth intermeshed between said rack bars while the rake is being raised in a substantially horizontal operative position by said cables, and means in the hoist for varying the relative length of the front cables with respect to the back cables to bring said rake to its substantially horizontal operative position and thereafter raising all of said cables in unison to lift said rake in a substantially horizontal position past said rack bars and out of said pit.

4. In a device for removing trash from the substantially vertically disposed rack bars of the trash pit of a hydraulic intake, the combination with a trash hoist of a trash rake having teeth with open ends suspended from said hoist by cables attached near each back end of said rake, and by cables attached near each front end of said rake, and guide plates carried by said rake for spacing it from said rack bars while said rake is being lowered into said pit in a substantially vertical inoperative position and a portion of said guide plates serving to guide said rake with the open ends of its teeth intermeshed between said rack bars while the rake is being raised in a substantially horizontal operative position by said cables, and means in the hoist for varying the relative length of the front cables with respect to the back cables to bring said rake to its substantially horizontal operative position and thereafter raising all of said cables in unison to lift said rake in a substantially horizontal position past said rack bars and out of said pit.

5. In a device for removing trash from the substantially vertically disposed trash pit rack bars of a hydraulic intake, the combination with a trash hoist, of a trash rake movably supported from said hoist and alternately movable to an inactive vertical position and to an active horizontal position, said rake comprising a frame, rake teeth carried by said frame and having portions movable between the cooperating bars of said rack, and substantially arcuate plates carried by said rake for sliding contact with the rack bars for guiding said rake in its vertical position with the rake teeth out of engagement with said rack bars, and in its horizontal position with the rake teeth intermeshed between said rack bars.

References Cited in the file of this patent

UNITED STATES PATENTS

| 1,039,688 | Belford | Oct. 1, 1912 |
| 1,179,181 | Harvey | Apr. 11, 1916 |
| 1,605,079 | Simmons | Nov. 2, 1926 |
| 1,848,972 | Peebles | Mar. 8, 1932 |
| 1,993,800 | Plant | Mar. 12, 1935 |

FOREIGN PATENTS

| 169,100 | Great Britain | Sept. 22, 1921 |